United States Patent [19]
Persson

[11] Patent Number: 4,890,028
[45] Date of Patent: Dec. 26, 1989

[54] ROTOR FOR A TURBO-GENERATOR

[75] Inventor: Tage Persson, Västerås, Sweden

[73] Assignee: Asea Aktiebolag, Västerås, Sweden

[21] Appl. No.: 603,879

[22] Filed: Apr. 25, 1984

Related U.S. Application Data

[63] Continuation-in-part of Ser. No. 325,952, Nov. 30, 1981, abandoned.

[51] Int. Cl.[4] .............................................. H02K 1/22
[52] U.S. Cl. ................................ 310/261; 310/112; 310/165; 310/208
[58] Field of Search ............... 310/261, 165, 262, 214, 310/264, 156, 265, 112, 71, 54, 61, 64, 198, 208, 216

[56] References Cited

U.S. PATENT DOCUMENTS

| | | | |
|---|---|---|---|
| 3,131,321 | 4/1964 | Gibbs | 310/54 |
| 3,393,333 | 7/1968 | Kudlacik | 310/61 |
| 3,469,127 | 9/1969 | Eggemann | 310/54 |
| 3,487,243 | 12/1969 | Wiedemann | 310/54 |
| 3,493,795 | 2/1970 | Kranz | 310/54 |
| 3,524,090 | 9/1970 | Sark | 310/71 |
| 3,594,597 | 7/1971 | Kildishev | 310/214 |
| 3,955,111 | 5/1976 | Weghaupt | 310/61 |
| 4,014,599 | 3/1977 | Bogdanov | 310/71 |

FOREIGN PATENT DOCUMENTS 2064692 12/1971 Fed. Rep. of Germany ........ 310/61

Primary Examiner—R. Skudy
Attorney, Agent, or Firm—Pollock, VandeSande & Priddy

[57] ABSTRACT

Generator rotor for a turbo-generator in which the rotor winding is fed via two feeding conductors, which are each arranged in a bored channel in the rotor body. The two channels diverge in relation to one another and each channel is bored in part in an axial shaft portion of the rotor body and in part in the slotted rotor portion of the rotor body.

9 Claims, 4 Drawing Sheets

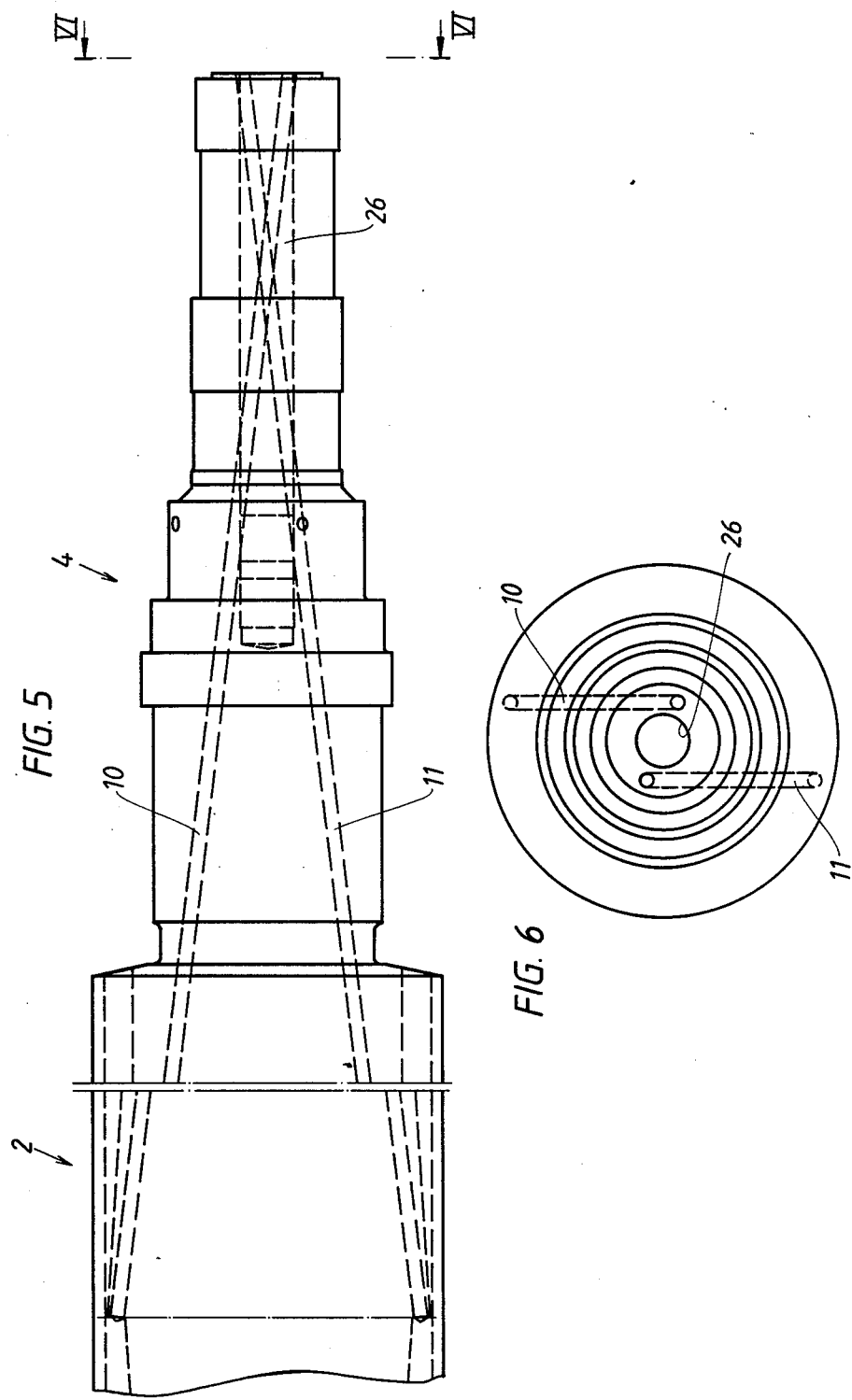

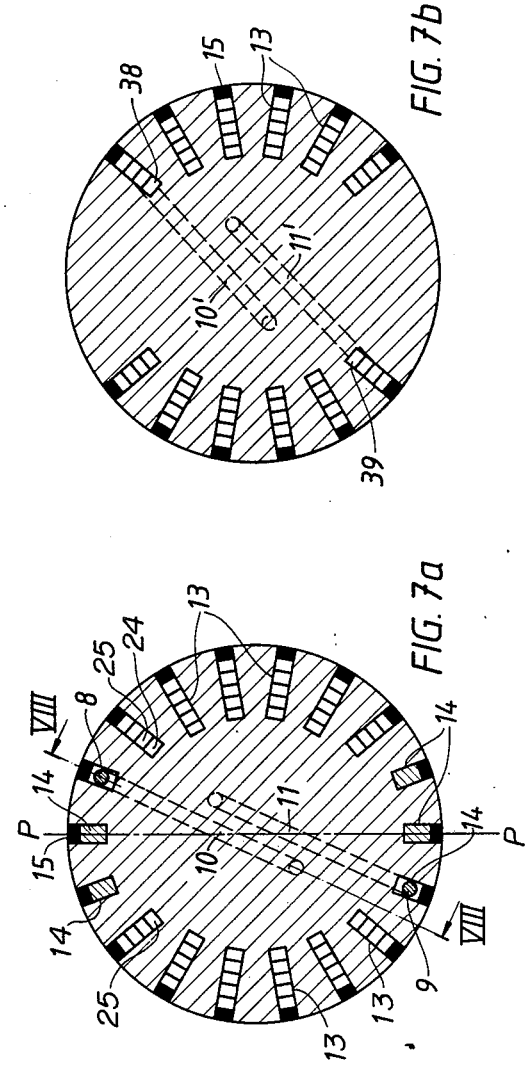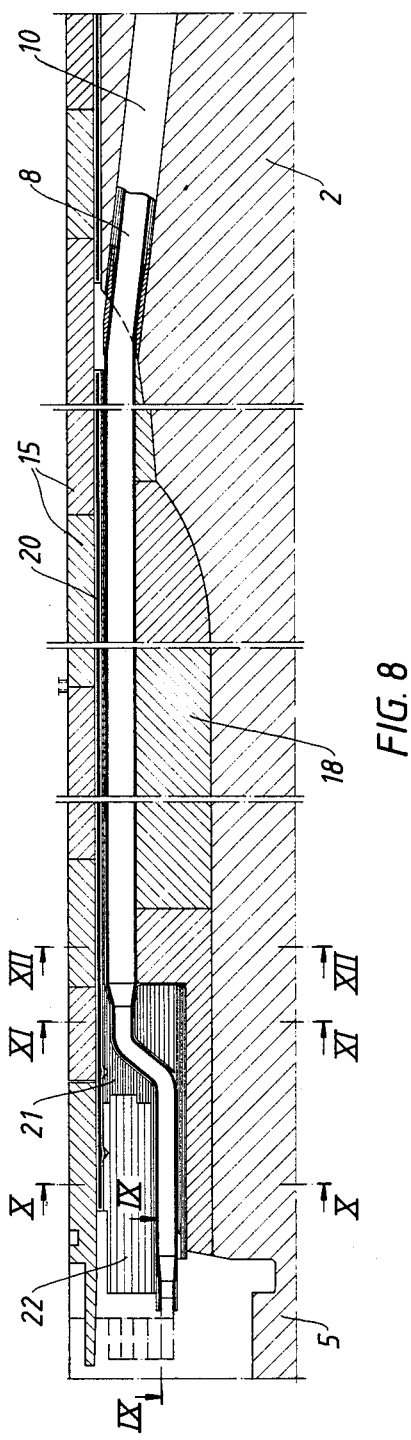

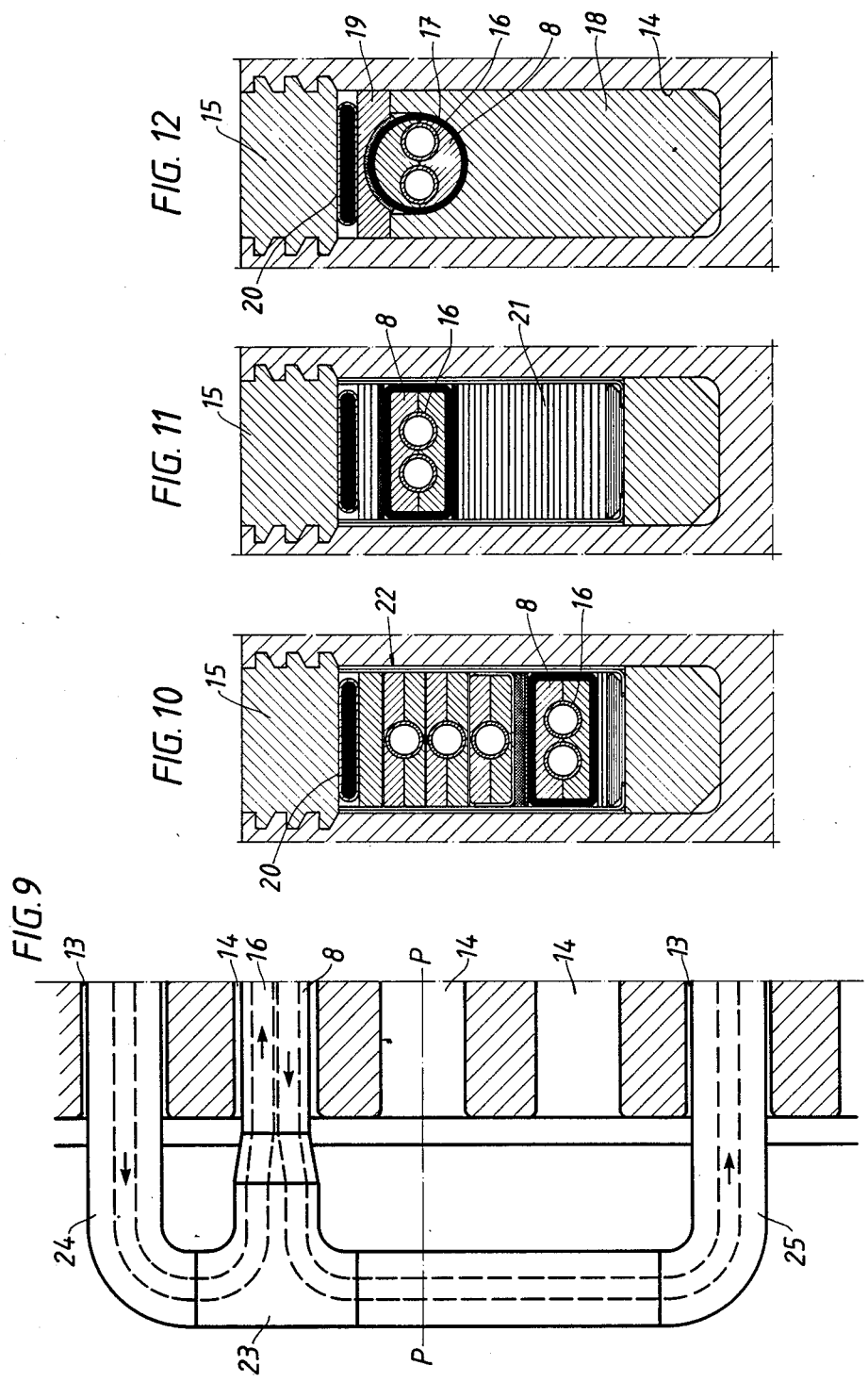

ROTOR FOR A TURBO-GENERATOR

RELATED APPLICATIONS

This is a continuation in part application of Ser. No. 325,952, filed Nov. 30, 1981, abandoned.

TECHNICAL FIELD

The present invention relates to the generator rotor of a turbo-generator of at least 20 MVA, comprising a rotor body of magnetic material and a rotor winding supported by said rotor body, said rotor body comprising a circular-cylindrical active portion which is provided with a plurality of winding slots extending axially along the entire active portion, as well as first and second shaft portions, extending from opposite ends of said cylindrical active portion, feeding conductors for the exciting current of the rotor winding being arranged in two conductor channels bored in said rotor body, said channels traversing at least a part of said first shaft portion. Rotors of this kind are disclosed in U.S. Pat. Nos. 3,131,321 and 3,493,795.

BACKGROUND ART

In a generator rotor according to 3,131,321, each of the two feeding conductors, connected to the rotor winding, has a portion disposed parallel to the axial center line of the rotor and adjacent thereto, which portion is arranged in direct electrical connection with a first radially directed portion, which is located in a radially directed bore. From this radial portion, the electric connection continues in the form of an axially extending conductor, embedded in the rotor shaft, which finally continues as a second radially outwardly-directed conductor portion which is connected to a point in that part of the rotor winding which is surrounded by a winding capsule. When the rotor speed increases from zero to its maximum value, the diameter of the winding capsule will increase considerably, for example by 5 mm, under the influence of centrifugal forces, and it may be assumed that the above-mentioned second radial conductor portion, similar to corresponding conductor portions of other known rotors, is connected to the rotor winding via a flexible conductor element. This flexible element is also stressed by movements of a relatively small amplitude but of a high frequency, namely movements substantially caused by deflection of said first shaft portion, i.e., in the shaft portion which is not connected to the driving turbine.

It has proved to be very difficult to achieve a sufficiently reliable, flexible connection between the rotor winding and the current feeding system of the rotor winding, and it has often been found that fatigue breakdown has taken place in the above-mentioned flexible conductor element after some time in operation. In the case where the fatigue failure is a complete breakage of the flexible conductor element, an arc arises which can easily result in harmful heating of the winding capsule, which in turn may cause very serious damage.

There have also been examples where the provision of radial conductor channels in the rotor shaft have resulted in shaft fracture.

In addition to the drawbacks mentioned above, the machine has the disadvantage that the current conducting means used for supplying current to the rotor winding is inconvenient and unreliable due to the fact that it comprises axial conductor units and radial conductor units, which have to be arranged in corresponding channels in the rotor body before they can be connected to each other.

With the rotor described in specification No. 3,493,795, the last-mentioned drawback is avoided since a shaft portion extending from the active portion of the rotor body is provided with two straight, mutually diverging conductor channels, each channel containing a single feeding conductor unit only. However, the channels terminate at the surface of the rotor shaft at an axial distance from the active portion of the rotor body. From the openings of the channels radially extending parts of the feeding conductors are connected to coil end portions extending axially from the active portion of the rotor body. The radially extending parts of the feeding conductors are subjected to fatigue failure - at least to the same extent as the above-mentioned flexible conductor elements. Further, the channel openings constitute indications of fraction, and since they are located at the surface of a relatively thin portion of the rotor body, they may result in shaft fracture.

STATEMENT OF THE INVENTION

According to the invention, there is provided a generator rotor for a turbo-generator of at least 20 MVA, comprising a rotor body of magnetic material having a substantially circular-cylindrical active portion with a plurality of winding slots extending axially along its entire length, a rotor winding with parts thereof located in said winding slots, a first shaft portion extending from one end of said active portion, a second shaft portion extending from the opposite end of said active portion, a turbine connecting means on said second shaft portion, two straight conductor channels, each bored in said rotor body and extending along said first shaft portion, and two feeding conductors for the exciting current of said rotor winding, one disposed in each of said channels, which is characterized in that said conductor channels extend through at least part of said active portion while diverging in said active portion and in said first shaft portion in the direction towards said second shaft portion.

BRIEF DESCRIPTION OF THE DRAWINGS

The invention will now be described, by way of example, with reference to the accompanying schematic drawings in which:

FIG. 5 shows a side view of part of the rotor schematically shown in FIG. 1, without the rotor winding and its associated winding capsule.

FIG. 6 shows the rotor of FIG. 5 in an end view perpendicular to the plane VI—VI of FIG. 5.

FIG. 7A shows a section along the line VII—VII of FIG. 1.

FIG. 7B shows a section through a second embodiment of rotor also in section along the line VII—VII of FIG. 1.

FIG. 8 shows a part of the rotor shown in FIG. 1 in partial axial section along the line VIII—VIII in FIG. 7A.

FIG. 9 shows a partial section along the line IX—IX of FIG. 8, a cylindrical sectional surface which is coaxial with the air gap surface being extended in one plane.

FIGS. 10, 11 and 12 each show a partial rotor cross-section along, respectively, the lines X—X, XI—XI and XII—XII in FIG. 8.

FIGS. 1, 5, 6, 7A and 8-12 refer to a first embodiment of a rotor according to the invention.

DESCRIPTION OF PREFERRED EMBODIMENTS

Figure 1:
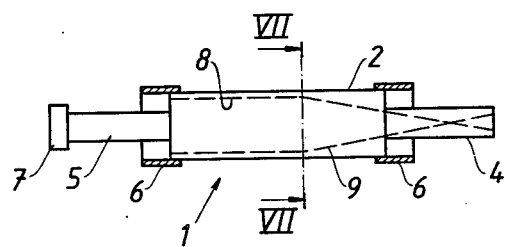
FIGS. 1, 2, 3 and 4 show four different embodiments of a rotor according to the invention in highly simplified form.

In FIGS. 1 to 4 of the drawings, the numerals 1, 1',1" and 1''' designate four different embodiments of a rotor according to the invention. In all cases, the rotor has a rotor body of solid steel which comprises a substantially circular-cylindrical active portion 2, 2',2" and 2''', respectively, which is provided with a plurality of winding slots axially extending along the entire length of this portion. A first shaft portion 4 and 4',4", 4''', respectively, and a second shaft portion 5, which constitute integrated parts of said rotor body, extend from one end each of said cylindrical portion, said second shaft portion being provided with a flange 7 for connection to a turbine. The coil ends (not shown) of the rotor are surrounded at each rotor end by a winding capsule 6, which is shrunk onto said cylindrical portion.

In the following text, the rotor shown in FIGS. 1, 5, 6, 7A, 8, 9, 10, 11 and 12 will first be described in greater detail. The rotor 1 receives exciting current from a supply unit (not shown) which is either mechanically connected to the shaft portion 4, and can thus feed the current directly to the rotor winding, or does not turn with the shaft portion 4 and feeds the said current via slip rings (not shown) arranged on the said shaft portion. The exciting current is supplied to the rotor winding via two feeding conductors 8 and 9, which traverse the entire shaft portion 4 as well as the entire active portion 2 and which are electrically connected to the ends of the rotor winding coils which are located at the end of the portion 2 which is adjacent to the shaft portion 5. Each of the feeding conductors 8 and 9 is electrically insulated and arranged in a straight conductor channel 10 and 11, respectively, bored in the rotor body. These channels are located on opposite sides of a central bore 26, which comprises a supply conduit and a return conduit (not shown) for cooling water flowing through the conductors of the rotor winding. The two conductor channels mutually diverge in the direction towards the shaft portion 5. The projections of the channels in an axial plane intersect each other at an angle of at least 7°, preferably at least 10°, if the axial plane is selected to maximize the said angle of intersection. The part of the active cylindrical portion 2 of the rotor body which is traversed by the diverging conductor channels 10 and 11, has an axial extension which preferably constitutes more than 20% of the total length of the portion 2.

The rotor 1 is provided with twelve winding slots 13 and with six auxiliary slots in the form of equalizing slot 14, which are arranged in a known manner to reduce the difference between different moments of inertia of the rotor cross-section and thus to avoid dangerous resonance frequencies of the rotor during operation. The slots 13 and 14 all have the same slot width and each is provided with a slot wedge consisting of a plurality of partial wedges 15 arranged axially one after the other.

The bored conductor channels 10 and 11 each open into a different equalizing slot 14 and the two slots are located diametrically or almost diametrically, opposite each other. The feeding conductors 8 and 9, in the respective channels, 10, 11, continue into the respective equalizing slot 14. The part of each feeding conductor which is located in an equalizing slot is, along a predominant part of its length in the slot, constructed in the same way as the part of the feeding conductor located in the bored channel, that is to say, it has a circular cross-section (see FIG. 12) with two cooling water tubes 16 squeezed between two conductor halves, and with a surrounding electrically insulating layer 17. In the slot 14, the circular conductor portion is clamped between an inner filling body 18 and an outer filling body 19 by means of a pressure device, known per se, which consists of a flattened metallic tube 20 filled with epoxy resin which has been allowed to solidify under a pressure of at least 100 bar. The two filling bodies 18 and 19 are made of solid steel, the inner body 18 being magnetic and the outer body 19 being non-magnetic. Four of the six equalizing slots 14 are made in a conventional manner with an unchanged slot depth along the entire slot length and filled with filling bodies of iron. The remaining two equalizing slots 14 which house the feeding conductors, are made with reduced slot depth along a minor portion of the slot length, namely, on both sides of the point where the bored conductor channel 10 or 11 opens out into the slot.

At that end of the slotted rotor portion 2, from which the shaft portion 5 extends, the filling bodies 18 and 19 are substantially replaced by a filling in the form of a stack of laminations 21 (see FIG. 11) consisting of a plurality of electrically insulating laminations of glass-fiber laminate, and (see FIG. 10) by a bundle 22 of short copper bars of the same cross-sectional dimensions as the current-carrying copper bars employed in the winding slots 13, and the feeding conductor 8 now has a rectangular cross-section with approximately the same width as these copper bars. With the aid of a T-shaped electrical connecting member 23 (see FIG. 9) the rectangular portion of the current feeding conductor 8, axially outside the slotted rotor portion, is electrically and hydraulically connected to two hollow conductors, 24 and 25. The directions of flow of the cooling water are indicated by arrows in FIG. 9. The dash dotted line P—P in FIGS. 7A and 9 indicates a middle plane through the poles. The conductor 24 is never current-carrying; it has only a strictly hydraulic task. The twelve winding slots 13 contain together six filled coils which are series connected to each other. Each field coil has two coil sides which are disposed symmetrically in relation to the plane P—P. In FIG. 7A, the upmost field coil, which has three winding turns, is constituted by the conductor 25. One end portion of the conductor 25 is connected to the feeding conductor 8 and disposed adjacent to the bottom in a winding slot disposed adjacent to a rotor pole. The other end of the conductor 25 is connected to the next coil in the group of series-connected field coils, and this connection is, in a conventional manner, carried out between coil ends disposed axially outside the slotted part of the rotor body, namely, the rotor end opposite to the rotor end disclosed in FIG. 9. Thus, the lefthand coil side of the upmost field coil of FIG. 7A comprises four conductor portions arranged one after the other in the radial direction, whereas the corresponding number of coil portions in the righthand coil side is three only. Accordingly, only ¾ of the corresponding slot is occupied by the field coil. The unoccupied part is used for the accommodation of a hydraulic connection means constituted by the conductor 24.

The downmost field coil disclosed in FIG. 7A constitutes the last coil in the group of six series-connected coils, whereas the upmost field coil disclosed in FIG. 7A constitutes the first coil in the same group. The feeding conductor 9 is arranged in an equalizing slot 14 and connected to the rotor winding and to hydraulic connecting means in the same way as described above for the feeding conductor 8.

Since the feeding conductors 8 and 9 are clamped in their slots in the same way as the axially extending parts of the rotor winding, they will participate in the oscillations of the rotor body in the same way as said parts, so that these oscillations will not result in significant fluctuating deformations of the feeding conductors of the connecting members 23 arranged between the said feeding conductors and the rotor winding.

Compared with a solid filling body, the bundle 22, shown in FIGS. 8 and 10, has the advantage of having approximately the same structure and the same versatility as similarly disposed winding parts more or less mechanically connected to the feeding conductor 8 and the connecting member 23. Thus, if mechanical oscillations for some reason should occur in the coil sides shown in FIG. 9, the stress on the connection between the feeding conductor 8 and the connection member 23 would be reduced, since the structure and, accordingly, the resonance frequency of the body composed of the bundle 22 and the feeding conductor 8 would not be much different from the resonance frequency of corresponding portions belonging to adjacent coil sides.

According to FIG. 8, the rectangular part of the feeding conductor 8 and its transition from the circular part are arranged in the stack of laminations 21 and formed with a double bend. It is also possible, however, to make the conductor portion, located in the slot 14, completely straight.

If it is desired for some reason to make the rotor 1 without axially extending auxiliary or equalizing slots, it is possible—as shown in FIG. 7B—instead of the above-described conductor channels 10 and 11 bored in the rotor body, to use bored conductor channels 10' and 11', which have approximately the same length as the channels 10 and 11 and which each opens out into a winding slot 13, the two winding slots being substantially diametrically arranged with respect to each other. Both in the case shown in FIG. 7A and in the case shown in FIG. 7B, the bored conductor channels are disposed in such a manner that the distance between them has its minimum value in the part of the shaft portion 4 surrounded by a rotor bearing. This is preferred since it reduces the risk that magnetic fluxes generated by the feeding conductors will give rise to detrimental induced electric currents in the bearing.

Figure 2:
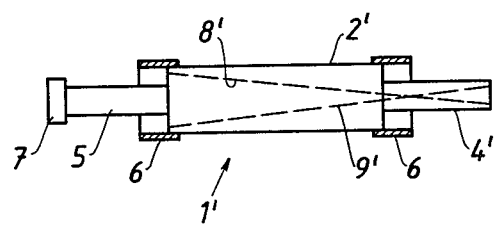

In the rotor 1' shown in FIG. 2, the feeding conductors 8' and 9' are arranged in bored conductor channels which extend throughout the shaft portion 4' and throughout the slotted rotor portion 2'. This involves a complication in so far as the bored holes are longer, but on the other hand, the demands for precision in the machining are reduced over those existing in the embodiment shown in FIG. 1, since each bored conductor channel no longer has to open out into a slot.

Figure 3:
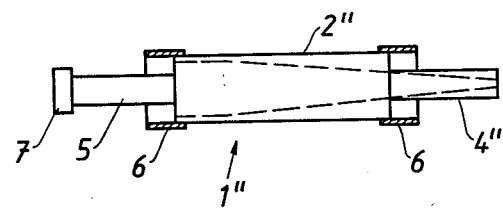
Figure 4:
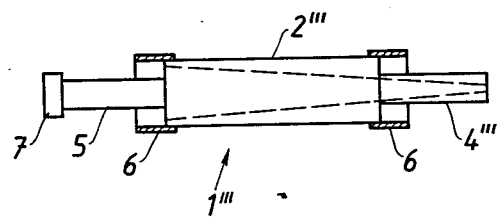

The embodiment shown in FIG. 3 differs from that shown in FIG. 1 in that the projections of the bored conductor channels in an axial plane do not intersect one another. In the same way, the embodiment shown in FIG. 4 differs from that shown in FIG. 2. It will also be noted that the length of the diverging part of the conductor channels is greater in the FIG. 3 embodiment than in the FIG. 1 embodiment.

In addition to the embodiments shown in the drawings, the invention also includes rotors in which the conductors arranged in the channels 10 and 11, after having opened out into corresponding axially extending slots, extend along these in a direction which is opposite to that shown in FIG. 8, the conductors being connected to the rotor winding approximately as shown in FIG. 8 but at the end of the rotor from which the shaft portion 4 projects.

In the event that the conductor channels are arranged to open out into a winding slot, for example in the same way as the channels 10' and 11' shown in FIG. 7B, the feeding conductors 38 and 39 extending through the channels may be passed along the winding slot in one or the other direction and be connected to the winding in much the same way as the feeding conductor 8 shown in FIG. 8, or each of the feeding conductors may be connected to the rotor winding within a corresponding winding slot.

In a rotor according to the invention, each feeding conductor, for example, the feeding conductor 8, is a prefabricated unit which can be mounted in the rotor body as a unit.

In the rotor described with reference to FIGS. 1, 5, 6, 7A and 8–12 is intended to be cooled by means of direct water cooling. A rotor according to the invention may just as well be made without cooling channels in the rotor winding.

A rotor according to the invention is usually made with at least twenty-four winding slots.

What is claimed is:

1. A generator rotor for a turbo-generator of at least 20 MVA, comprising:
    a rotor body of magnetic material having a substantially circular-cylindrical active portion which includes a plurality of winding slots formed therein, the winding slots extending axially along the entire length of said active portion
    a rotor winding with parts thereof located in said winding slots;
    a first shaft portion extending from one end of said active portion of the rotor body;
    a second shaft portion extending from the opposite end of said active portion of the rotor body;
    a turbine connecting means on said second shaft portion;
    two straight conductor channels, each bored in said active portion of the rotor body and extending along the whole length of said first shaft portion; and
    two feeding conductors for the exciting current of said rotor winding, one disposed in each of said channels;
    said conductor channels extending through at least part of said active portion while diverging in this and in said first shaft portion in the direction towards said second shaft portion.

2. A rotor according to claim 1, in which said feeding conductors are connected to parts of said rotor winding axially outside said winding slots at that end of said active portion from which said second shaft portion extends.

3. A rotor according to claim 1, in which each of said conductor channel opens into a corresponding axially extending slot formed in said active portion of the rotor body and provided with a slot wedge, each of said feeding conductor thus being disposed in part in its respective conductor channel and in part in one such slot.

4. A rotor according to claim 3, in which each of said feeding conductors is connected to said rotor winding at the end of the substantially circular-cylindrical active portion from which said first shaft portion extends.

5. A rotor according to claim 3, wherein each of said conductor channels opens into one of said winding slots, said winding slots located substantially diametrically opposite with respect to one another in the rotor.

6. A rotor according to claim 3, in which, in addition to the slots in which parts of the rotor winding are located, the active portion of the rotor is provided with two auxiliary slots arranged substantially diametrically with respect to one another, the said conductor channels opening into respective ones of said auxiliary slots.

7. A rotor according to claims 1, 2 or 3, in which the part of said active portion which is traversed by said diverging conductor channels constitutes more than 20% of the total length of said active portion.

8. A rotor according to claims 1, 2 or 3, in which the angle of inclination between the projections of the diverging parts of the conductor channels in an axial plane of the rotor selected to maximize the said angle of intersection is at least 7°.

9. A rotor according to claims 1, 2 or 3, in which the angle of inclination between the projections of the diverging parts of the conductor channels in an axial plane of the rotor selected to maximize the said angle is at least 10°.

* * * * *